US 8,718,818 B2

(12) United States Patent
Nordbryhn

(10) Patent No.: US 8,718,818 B2
(45) Date of Patent: May 6, 2014

(54) DEVICE AND METHOD RELATED TO RETURN OF EMPTY BEVERAGE CONTAINERS

(75) Inventor: Andreas Nordbryhn, Oslo (NO)

(73) Assignee: Tomra Systems ASA, Asker (NO)

( * ) Notice: Subject to any disclaimer, the term of this patent is extended or adjusted under 35 U.S.C. 154(b) by 185 days.

(21) Appl. No.: 13/002,236

(22) PCT Filed: Jul. 2, 2009

(86) PCT No.: PCT/NO2009/000247
§ 371 (c)(1),
(2), (4) Date: Mar. 11, 2011

(87) PCT Pub. No.: WO2010/002271
PCT Pub. Date: Jan. 7, 2010

(65) Prior Publication Data
US 2011/0184553 A1 Jul. 28, 2011

(30) Foreign Application Priority Data
Jul. 3, 2008 (NO) .................................... 20083001

(51) Int. Cl.
*G06F 17/00* (2006.01)
*G07F 7/06* (2006.01)
*G06K 9/00* (2006.01)

(52) U.S. Cl.
USPC ............ 700/237; 700/240; 700/236; 700/232

(58) Field of Classification Search
USPC .................... 700/232, 236, 237, 240
See application file for complete search history.

(56) References Cited

U.S. PATENT DOCUMENTS

| 5,257,741 A | * | 11/1993 | Rode et al. ................. 241/24.12 |
| 5,624,018 A | * | 4/1997 | Schuff et al. .................. 194/209 |
| 5,918,721 A | * | 7/1999 | Weinberger .................. 194/208 |
| 5,943,423 A | * | 8/1999 | Muftic ............................ 705/67 |
| 6,629,591 B1 | * | 10/2003 | Griswold et al. ............. 194/205 |

(Continued)

FOREIGN PATENT DOCUMENTS

| CN | 1707528 A | 12/2005 |
| CN | 200990114 Y | 12/2007 |

(Continued)

*Primary Examiner* — Michael K Collins
(74) *Attorney, Agent, or Firm* — Birch, Stewart, Kolasch & Birch, LLP

(57) ABSTRACT

An apparatus, method, system and use of a least one sensor in a reverse vending machine for empty beverage containers for, on the sensor's detection at least one biometric feature of a person, allowing such a feature to serve as an identifying token for return value due for empty beverage containers delivered by the person to the reverse vending machine. The biometric feature is, at a return value payout point and by using at least one other sensor, redetected and re-recognized as a previously registered feature for payment of the return value in the form of a payout of the return value, credit for the return value or issuance of a lottery ticket with a stake equivalent to the return value. Said biometric feature is selected from at least one of the group consisting of: fingerprints, facial features, eye characteristics, iris features, handprints, palm line patterns, blood vessel patterns, body shape, height, weight, DNA-characteristics and voice spectrum.

23 Claims, 2 Drawing Sheets

(56) References Cited

U.S. PATENT DOCUMENTS

| | | | |
|---|---|---|---|
| 7,464,059 B1* | 12/2008 | Robinson et al. | 705/67 |
| 7,762,470 B2* | 7/2010 | Finn et al. | 235/492 |
| 8,355,982 B2* | 1/2013 | Hazel et al. | 705/38 |
| 2003/0055727 A1 | 3/2003 | Walker et al. | |
| 2007/0198432 A1* | 8/2007 | Pitroda et al. | 705/64 |
| 2007/0209458 A1 | 9/2007 | Bruland | |
| 2008/0041996 A1* | 2/2008 | Shaw et al. | 241/236 |
| 2009/0281891 A1* | 11/2009 | Walker et al. | 705/14.38 |
| 2011/0213709 A1* | 9/2011 | Newman et al. | 705/44 |

FOREIGN PATENT DOCUMENTS

| | | |
|---|---|---|
| CN | 101176124 A | 5/2008 |
| JP | 61-25671 U | 2/1986 |
| JP | 6-19073 U | 3/1994 |
| JP | 2001-23011 A | 1/2001 |
| JP | 2002-87511 A | 3/2002 |
| JP | 2002-312835 A | 10/2002 |
| NO | 323842 B1 | 9/2007 |
| WO | WO 2004/105952 A1 | 12/2004 |
| WO | WO 2007/100257 A1 | 9/2007 |

* cited by examiner

DEVICE AND METHOD RELATED TO RETURN OF EMPTY BEVERAGE CONTAINERS

The present invention relates to a reverse vending machine apparatus for empty beverage containers, the reverse vending machine having a receiving part for insertion of beverage containers, a device for detecting and/or recognising one or more inserted beverage containers, and a device for providing a token for the return value of such beverage containers.

The invention further relates to a method for returning empty beverage containers to a reverse vending machine, wherein insertion of the containers is initiatable, wherein the containers are detected and/or recognised, and wherein a token is provided for the return value of such beverage containers.

In addition, the invention relates to a handling and payout system for received empty beverage containers, the system comprising:
- a reverse vending machine for beverage containers, the reverse vending machine having a receiving part for insertion of beverage containers, a device for detecting and/or recognising one or more inserted beverage containers, and a device for providing a token for the return value of such beverage containers; and
- a return value payout point for paying out at that point, on the presentation of the token, the return value related to the token.

Reverse vending machines for empty beverage containers were introduced on the market in 1972 and have since then been launched all over the world in many different designs and from many different manufacturers. Such machines are, as a general rule, equipped with a printer which prints out a receipt for received empty beverage containers, so that the customer can take the receipt with him to a checkout point, usually a cash register, where the customer is given money or other consideration on handing in the receipt. Often, this transaction takes place at the same time as the customer pays for goods that have been collected in the shop premises. In some cases, such receipts are replaced by cards with a reference marked thereon, so that the customer on handing in the card at the cash register is remunerated with the sum that is communicated to the cash register from the reverse vending machine, even though the card does not contain any detailed information about the number of beverage containers that have been inserted and their value. Such cards are therefore reusable once they have been paid out on and the card is no longer validated.

However, it is well known that a number of reverse vending machines malfunction because the printer has run out of paper, paper becomes jammed or because the discharge mechanism of the printer fails. Such a printer generally has a number of moving parts, in addition to there often being a paper cutter in connection with the printer. When said cards are used, a number of moving parts are present for discharging only one card at a time, in addition to equipment for reading what is printed on the card, whether the information is optical, magnetic or in the form of information on an RF chip in the card.

Therefore, both with the manufacturers and with owners of shops and other retail outlets in which such reverse vending machines have been installed, there has been a desire for more reliable reverse vending machines as regards devices for providing tokens which the customer can use in order to be remunerated for returned beverage containers.

The object of the present invention is therefore to provide a solution for this need, and the apparatus referred to above is characterised according to the invention in that said device consists of a sensor that is arranged to sense or read at least one selected biometric feature of a person inserting beverage containers into the reverse vending machine, and that said sensed biometric feature serves as said token.

Additional embodiments of the apparatus are set forth in attached subsidiary claims 2-5.

The aforementioned method is characterised, according to the invention, in that said biometric features of the person inserting beverage containers into the reverse vending machine are used as said token, and that at least one biometric feature of the person is detected and registered prior to the start of receiving beverage containers.

Additional embodiments of the method are set forth in attached subsidiary claims 7-10.

The system referred to above is characterised, according to the invention, in that said device consists of a first sensor that is adapted to detect at least one biometric feature of a person inserting beverage containers into the reverse vending machine, that said selected sensed biometric feature serves as said token, and that the return value payout point is equipped with at least one second sensor adapted to re-detect the person's said biometric feature.

Additional embodiments of the system are set forth in attached subsidiary claims 12-15.

In addition, the invention is distinguished by the use of a biometric feature of a person as identifying token for the return value due for empty beverage containers delivered by the person to the reverse vending machine. A further aspect of this use is set forth in attached subsidiary claim 17.

Moreover, the invention is distinguished by the use of a sensor in a reverse vending machine for empty beverage containers for, on the sensor's detection of at least one biometric feature of a person, allowing such a feature to serve as an identifying token for return value due for empty beverage containers delivered by the person to the reverse vending machine. Additional aspects of this use are set forth in attached, subsidiary claims 19 and 20.

Although the use of biometric features has been known for a number years in many connections, for example, in connection with access systems, and more recently for security checks in connection with flight departures or in connection with the sale of valuables which are to be dispensed from a distribution machine (such as that sold by Vensafe AS, Norway), the present invention nevertheless meets a need and solves a technical problem that have existed for quite a number of years. In addition, the invention helps to prevent the customer from losing or forgetting to take with him the standard receipt or simply forgetting to hand it in at the cash register.

These and additional features, aspects and advantages of the invention will now be explained more fully with reference to the attached drawings.

Figure 1:
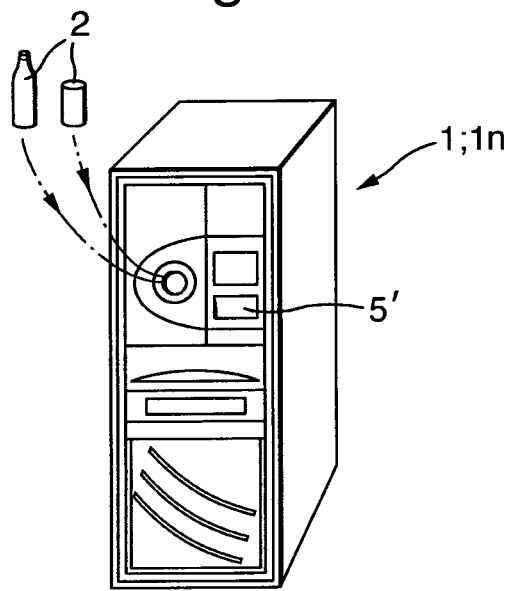
FIG. 1 shows a reverse vending machine apparatus according to the invention.
Figure 2:
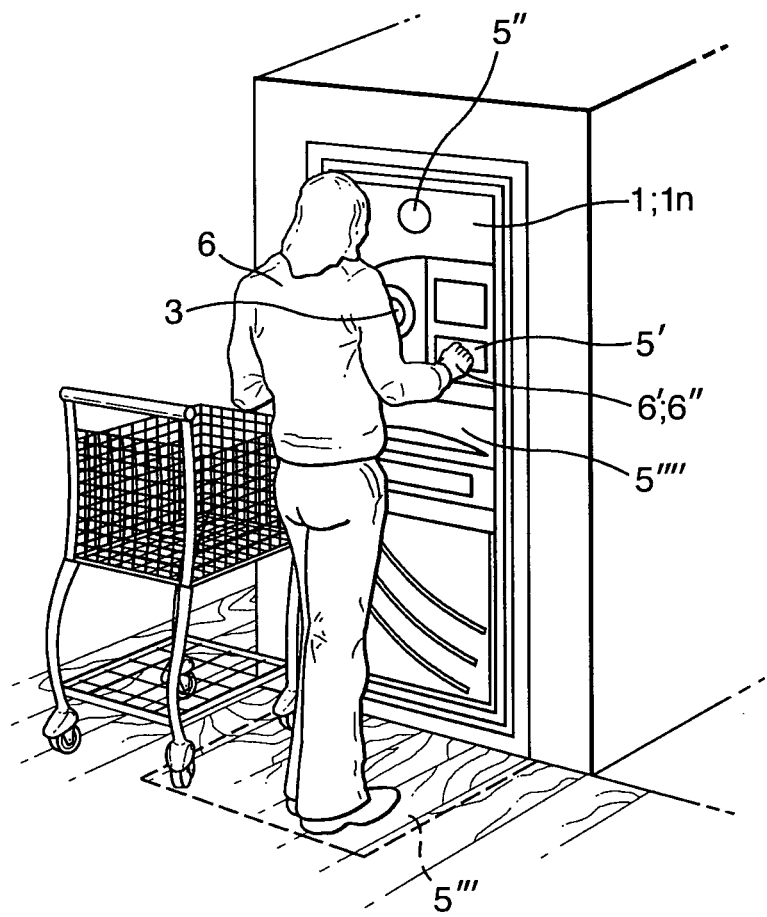
FIG. 2 shows a reverse vending machine being operated by a person to effect establishment of a return value token.
Figure 3:
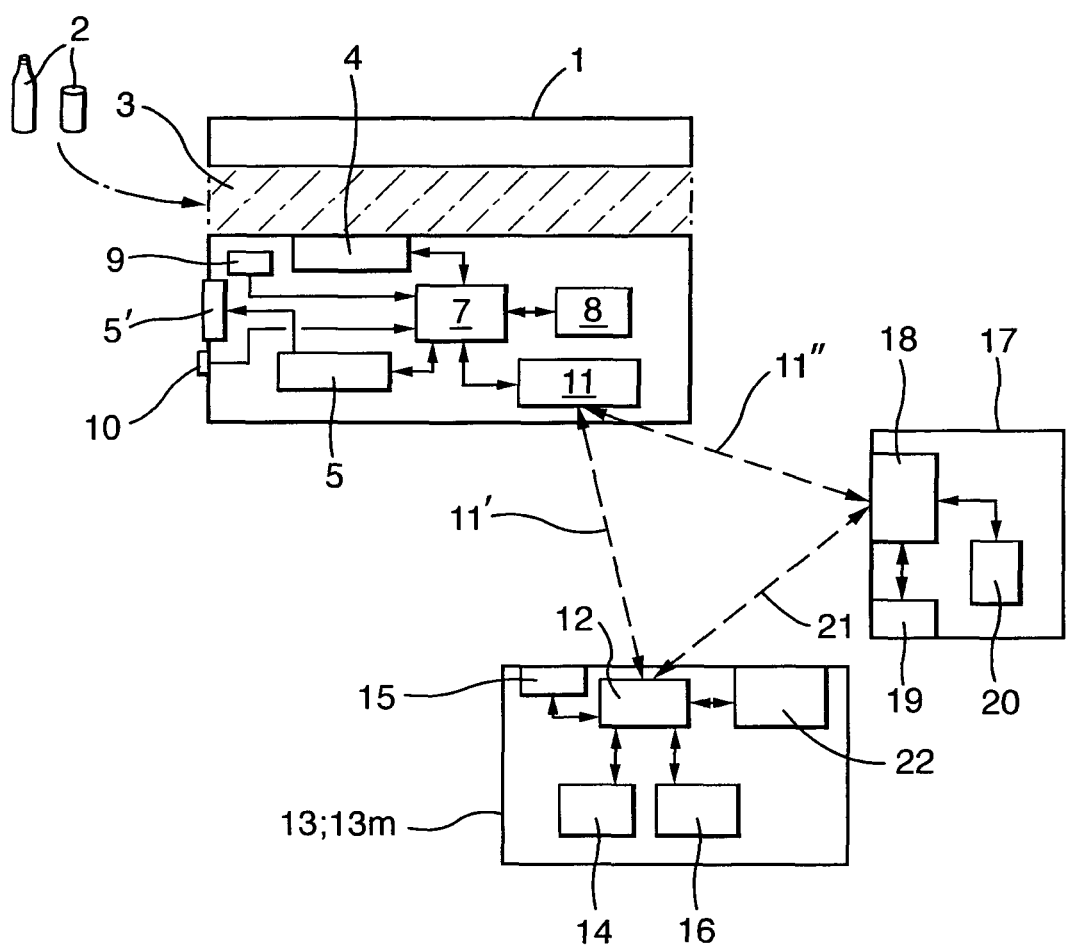
FIG. 3 shows in the form of a block diagram a reverse vending machine that is associated with a return value payout point or checkout point, optionally via a central unit.

As mentioned in the introduction, reverse vending machines 1; 1n for empty beverage containers 2 have existed for over 35 years. Such a reverse vending machine 1 has traditionally a receiving part 3 for insertion of beverage containers 2 and a device 4 for detecting and/or recognising one or more inserted beverage containers. Such a device 4 will usually perform a contour recognition of the beverage containers and/or detection of markings or identifiers on the containers, for example, a bar code, stamps or other visible or non-visible identifiers. In other cases, detection will only be made of the material of the beverage containers and any identifiers related to its value or manufacture. In addition, such known reverse vending machines have a device 5 for providing a token for the return value of such beverage containers. In the known solutions, this device is usually a receipt printer.

However, in the present invention, included in said device 5 is at least a first sensor 5' that is adapted to sense at least one selected biometric feature, e.g., fingerprint 6' of a person 6 inserting beverage containers 2 into the reverse vending machine. Thus, said selected biometric feature will be able to serve as said token. The person 6 will therefore be asked to allow the detectable biometric feature to be detected. If the biometric feature 6' is a fingerprint, the person 6 must allow his fingerprint, for example, on his right-hand index finger, to be detected by the sensor 5' and registered in a processor 7 with associated temporary memory 8 before the machine starts for receiving beverage containers.

A start circuit 9 for the reverse vending machine 1 is advantageously included in said device. Thus, the reverse vending machine 1 is designed to start receiving beverage containers 2 only when said biometric feature 6' has been satisfactorily detected and registered. This solution is regarded as advantageous since automatic start of the reverse vending machine 1 on insertion of beverage containers 2, and then desired sensing of the biometric feature once all the beverage containers have been inserted and a "receipt" in the form of token 6' is requested, may in some cases result in the biometric feature not being detectable because the customer 6 does not manage to follow the instructions, or because the biometric feature 6' contains anomalies which prevent it from being detected and temporarily registered.

The reverse vending machine 1 can however be equipped with a receiving stop button 10. An alternative to this is that said device 5 when reactivated, i.e., that the sensor 5' re-detects the biometric feature, acts as a receiving stopper.

The reverse vending machine 1 processor 7, once receiving of empty beverage containers is terminated, will transfer the biometric data 6' registered in the temporary memory 8, together with the registered return value for inserted beverage containers 2 from the reverse vending machine processor 7, via a transmission unit 11 and connection 11' to a processor 12 at the return value payout point 13; 13m, where the data is stored temporarily in a memory 14.

When the person 6 comes to the checkout point, i.e., the return value payout point 13; 13m, he must again allow the biometric features 6' to be detected by at least one other sensor 15. If the biometric feature which forms said token 6' is, for example, said fingerprint on the person's right index finger, the person 6, upon arrival at the return value payout point 11, will be instructed to allow his fingerprint to be read again, this time by the sensor 15.

The return value payout point 13; 13m may, for example, be a cash register in a shop or in a retail outlet.

Said return value payout point 13; 13m has a correlator 16 or is connected to a correlator 20 in a central unit 17, and the correlator will, when there is a feature match between the token 6' that has been transferred from the reverse vending machine 1 and the biometric feature 6" detected by the sensor 15, effect payment of the return value to the person 6. This payment may take place in the form of a payout of the return value, credit for the return value or issuance of a lottery ticket with a stake equivalent to the return value, for example, from a payout unit 22.

Alternatively, it is possible to allow the memory 14 to be replaced by a central memory 19 in the central unit 17. Similarly, it may also be appropriate to allow the correlator to be located in the central unit 17 common to a plurality of return value payout points 13m. Such a central correlator is, as indicated above, designated by the reference numeral 20. In this case, the biometric feature 6' and the return value are transferred from the reverse vending machine 1, or the relevant reverse vending machine of a plurality of reverse vending machines 1n, to a processor 18 for storage in the memory 19. The processor 18 will control receipt and temporary storage of biometric data and return values, correlation of such information, and provide communication with both the reverse vending machine 1; 1n and the return value payout point processor 12. Communication with the reverse vending machine takes place via a unit 11 and the connection 11", whilst the connection with the return value payout point 13; 13m takes place via a connection 21.

It is indicated above that as biometric feature that is to serve as said token 6', the person's/customer's 6 fingerprint 6' may be used. However, it is possible to conceive of using as the token this, another or other biometric features, either in the form of only one such feature or in the form of two or more such features.

According to the invention, it is suggested that said biometric features be selected from at least one of the group consisting of fingerprints, facial features, eye characteristics, iris features, handprints, palm line patterns, blood vessel patterns, body shape, height, weight, DNA characteristics and voice spectrum. For example, to use as identifying feature one or more of facial features, eye characteristics (for example, iris features), body shape, height and voice spectrum, it will, for instance, be possible to use a sensor 5" which may contain a camera, microphone or the like. If the weight of the person is to be measured, there must be a weight sensor 5''' ahead of the reverse vending machine. The sensor 5' may, for example, not only be suitable for detecting fingerprints, but will also in addition or alternatively read handprints or palm line patterns. Detection of blood vessel patterns on, for example, the back of the hand could, for instance conceivably be detected by the person inserting his hand under a detection field 5'''', or by the device 4 having such additional function and where reading is permitted in that the person inserts his hand briefly into the receiving area 3. Even though rapid determination of DNA characteristics is not possible at present, at least not in an inexpensive way, it is conceivable that a detector could take samples of body fluids, such as perspiration on a hand or possibly a painless blood sample.

In most cases, as appreciated from the above, there could be in or at the retail outlet a plurality of reverse vending machines 1n and similarly a plurality of return value payout points 13m. In this case, the said central unit could be expedient, such that in reality only the sensor 13, the processor 12 and the unit 22 are found at each return value payout point It is important to note that when said return value has been paid out, the temporarily stored biometric data concerning the person's biometric features is deleted at the same time, so that the return value is no longer related to any valid token. This also means that when the biometric features and return value are transferred from the reverse vending machine to the return value payout point, optionally via the central unit 17, the data that was in the reverse vending machine memory 8 will be deleted there.

However, it will be understood that the return value payout point processor 12 and/or the central processor 18, and optionally the reverse vending machine processor 7 can store data regarding the number of received beverage containers and total payout of return value, optionally divided among different types of beverage container. This will be person-neutral information for statistical use and accounting controls.

As empty beverage containers cannot be put into the reverse vending machine before the biometric feature or features has/have been detected and registered, and since the return value payout point will always have a reminder to deliver the registered token because at least one sensor 15, corresponding to said at least one sensor 5' in the reverse vending machine, is present and visible, the risk of the customer forgetting to claim payment of the return value is minimised.

The invention claimed is:

1. A reverse vending machine apparatus for empty beverage containers, the reverse vending machine comprising:
    a receiving part for insertion of beverage containers;
    equipment for detecting and/or recognizing one or more inserted beverage containers; and
    a device for providing a token for the return value of said one or more inserted beverage containers, said token-providing device including:
    at least one first sensor that is configured to detect at least one biometric feature of a person inserting beverage containers into the reverse vending machine; and
    a device configured to define and register said detected biometric feature as a return value token.

2. The apparatus according to claim 1, wherein the reverse vending machine is adapted to communicate with at least one return value payout point for paying out at the return value payout point, on presentation of the token, the return value related to the token, the return value payout point being equipped with at least one second sensor adapted to re-detect said token in the form of the person's said biometric feature.

3. The apparatus according to claim 2, wherein the return vending machine, with registered biometric data, is adapted to transfer to and temporarily store at said at least one return value payout point or in a central unit the said data together with a registered return value, the return value payout point being equipped with at least one second sensor adapted to re-detect the person's said biometric feature, and where a correlator at the return value payout point or in the central unit, when there is a feature match, is adapted to effect via a payout unit payment of the return value to the person in the form of a payout of the return value, credit for the return value or by issuing a lottery ticket with a stake corresponding to the return value.

4. The apparatus according to claim 1, wherein said device is part of a start circuit for the reverse vending machine, the machine being adapted to start receiving beverage containers only when said biometric feature has been satisfactorily detected and registered.

5. The apparatus according to claim 1, wherein the reverse vending machine is equipped with a receiving stop button, or said device when reactivated acts as a receiving stopper.

6. The apparatus according to claim 1, wherein said sensor is of a type that is adapted to read biometric features from at least one of the group consisting of: fingerprints, facial features, eye characteristics, iris features, handprints, palm line patterns, blood vessel patterns, body shape, height, weight, DNA-characteristics and voice spectrum.

7. A reverse vending machine apparatus for empty beverage containers, the reverse vending machine comprising:
    a receiving part for insertion of beverage containers;
    equipment for detecting and/or recognizing one or more inserted beverage containers;
    a device for providing a token for the return value of said one or more inserted beverage containers;
    at least one first sensor incorporated in said token-providing device, wherein said at least one first sensor is configured to detect at least one biometric feature of a person inserting beverage containers into the reverse vending machine, and said device for providing a token includes a device configured to define said sensor-detected biometric feature as said token; and
    at least one return value payout point adapted to pay out, on presentation of the token, the return value related to the token, the return value payout point being equipped with at least one second sensor configured to re-detect the person's said biometric feature.

8. The apparatus as disclosed in claim 7, wherein said device is part of a start circuit for the reverse vending machine, the machine being adapted to start receiving beverage containers only when said biometric feature has been satisfactorily detected and registered.

9. The apparatus as disclosed in claim 7, wherein the reverse vending machine is equipped with a receiving stop button, or said device when reactivated acts as a receiving stopper.

10. The apparatus as disclosed in claim 7, wherein said sensor is of a type that is adapted to read biometric features from at least one of the group consisting of: fingerprints, facial features, eye characteristics, iris features, handprints, palm line patterns, blood vessel patterns, body shape, height, weight, DNA- characteristics and voice spectrum.

11. A method for returning empty beverage containers to a reverse vending machine, wherein the containers are detected and/or recognized, and a token for the return value of the beverage containers is provided, said method comprising the steps of:
    detecting at least one biometric feature of a person inserting beverage containers into a receiving part of the reverse vending machine before the start of receiving beverage containers; and
    defining and registering said detected biometric feature as a token for the return value of the beverage container.

12. The method according to claim 11, further comprising the steps of:
    before payment of said return value to the person at the return value payout point, re-detecting said previously detected feature of the person at the return value payout point and comparing with the said transferred and temporarily stored data; and
    when there is a match between the previously and newly detected features, effecting payment of the return value in the form of a payout of the return value, credit for the return value, or issuance of a lottery ticket with a stake equivalent to the return value.

13. The method according to claim 11, wherein the stored data concerning the person's biometric features is deleted at the same time as the return value is paid out.

14. The method according to claim 11, wherein said biometric features are selected from at least one of the group consisting of: fingerprints, facial features, eye characteristics, iris features, handprints, palm line patterns, blood vessel patterns, body shape, height, weight, DNA-characteristics and voice spectrum.

15. A method of returning empty beverage containers to a reverse vending machine, wherein the insertion of containers is initiatable, wherein the containers are detected and/or recognized, and wherein a token for the return value of the beverage containers is provided, said method comprising the steps of:

using biometric features of a person inserting the beverage containers into the reverse vending machine as said token;

detecting and registering at least one biometric feature of the person before the start of receiving beverage containers; and before the payout of said return value to the person at the return value payout point, re-detecting and comparing said previously detected feature of the person with a transferred and temporarily stored data concerning the detected and registered biometric feature of the person, and when there is a match between the previously and the newly detected features, effecting payment of the return value in the form of a payout of the return value, credit for the return value, or issuance of a lottery ticket with a stake equivalent to the return value.

16. The method according to claim 11 or 15, wherein on termination of receiving of beverage containers that have been inserted by the person, data concerning the registered biometric features is transferred to and temporarily stored in at least one data store in or in communication with, a return value payout point together with the registered return value of the received beverage containers that is to be paid out or credited to said person.

17. The method as disclosed in claim 15, wherein the stored data concerning the person's biometric features is deleted at the same time as the return value is paid out.

18. The method as disclosed in claim 15, wherein said biometric features are selected from at least one of the group consisting of: fingerprints, facial features, eye characteristics, iris features, handprints, palm line patterns, blood vessel patterns, body shape, height, weight, DNA-characteristics and voice spectrum.

19. A handling and payout system for received empty beverage containers, the system comprising:
 a reverse vending machine for beverage containers, said reverse vending machine comprising:
 a receiving part for the insertion of beverage containers;
 a device for detecting and/or recognizing one or more inserted beverage containers; and
 a device for providing a token for the return value the one or more inserted beverage containers; and
 a return value payout point adapted, on the presentation of the token, to pay out the return value related to the token, wherein said token-providing device includes:
 at least one first sensor that is arranged to detect at least one biometric feature of a person inserting beverage containers into the reverse vending machine; and
 a device configured to define said detected biometric feature as said token; and
 wherein the return value payout point is equipped with at least one second sensor adapted to re-detect the person's said biometric feature.

20. The system according to claim 19, wherein said device is part of a start circuit for the reverse vending machine, the machine being adapted to start receiving beverage containers only when said biometric feature has been adequately detected and registered.

21. The system according to claim 19, wherein the reverse vending machine is equipped with a receiving stop button, or said device when reactivated works as a receiving stopper.

22. The system according to claim 19, wherein the return vending machine, with registered biometric data, is adapted to transfer to and temporarily store in at least one return value payout point or a central unit the said data together with registered return value, a correlator is included in or communicates with the return value payout point, and the correlator, when there is a match between features detected by respectively the first sensor and the second sensor is adapted to effect payment of the return value to the person in the form of a payout of the return value, credit for the return value, or issuance of lottery tickets with a stake corresponding to the return value.

23. The system according to claim 19, wherein said biometric features are selected from at least one of the group consisting of: fingerprints, facial features, eye characteristics, iris features, handprints, palm line patterns, blood vessel patterns, body shape, height, weight, DNA-characteristics and voice spectrum.

* * * * *